United States Patent

[11] 3,626,909

| [72] | Inventors | Motoyuki Hayashida;<br>Mutsuo Wakamoto, both of Hiroshima, Japan |
|---|---|---|
| [21] | Appl. No. | 46,851 |
| [22] | Filed | June 17, 1970 |
| [45] | Patented | Dec. 14, 1971 |
| [73] | Assignee | Toyo Kogyo Company Limited<br>Hiroshima, Japan |
| [32] | Priority | June 17, 1969 |
| [33] | | Japan |
| [31] | | 44/48094 |

[54] ROTARY PISTON INTERNAL COMBUSTION ENGINE
5 Claims, 4 Drawing Figs.

| [52] | U.S. Cl. | 123/8.05, 123/117 A, 123/148 DS |
|---|---|---|
| [51] | Int. Cl. | F02b 53/12 |
| [50] | Field of Search | 123/8.05, 8.09, 148 DS, 117 A |

[56] References Cited
UNITED STATES PATENTS

| 3,534,717 | 10/1970 | Froede | 123/8.05 |
|---|---|---|---|
| 3,540,422 | 11/1970 | Kelly | 123/117 A |
| 3,400,698 | 9/1968 | Kelly | 123/117 A |
| 3,487,819 | 1/1970 | Wiyazaki | 123/117.1 |

*Primary Examiner*—Mark M. Newman
*Assistant Examiner*—Alan G. Goedde
*Attorney*—Sughrue, Rothwell, Mion, Zinn & Macpeak ABSTRACT: A rotary piston internal combustion engine has two spark plugs in one combustion chamber and divides the range of the operating states of the engine into those lying below and above a predetermined temperature value for the engine or exhaust gas and below or above a predetermined intake vacuum pressure wherein the ignition timing of the respective spark plugs is controlled depending upon the state so as to reduce the unburned detrimental components in the exhaust gas while maintaining the performance of the engine responsive to the four operating states.

INVENTORS
MOTOYUKI HAYASHIDA
MUTSUO WAKAMOTO

BY Sughrue, Rothwell, Mion,
Zinn & Macpeak
ATTORNEYS

ROTARY PISTON INTERNAL COMBUSTION ENGINE

BACKGROUND OF THE INVENTION

1. Field of the Invention

This invention relates to improvements within a rotary piston internal combustion engine of the type employing two spark plugs in a single combustion chamber and, more particularly, to an ignition system for controlling the ignition timing of both spark plugs to remove the unburned detrimental components in the exhaust gas while maintaining engine performance. Further, the ignition system controls operation of the engine over four operating states. The states are divided such that the first state involves the warming up of the engine which is from the start of the engine to the state in which the engine becomes heated to a predetermined temperature and a post warming up state, and these states are further divided into decelerating, idling, low speed low load, and high speed high load operation, which are below a predetermined value for the intake vacuum and into the other normal operation which is over a predetermined value for the intake vacuum.

2. Description of the Prior Art

Generally, in a rotary piston internal combustion engine which has three or more apexed pistons sliding in contact with the inner periphery of a casing which in turn has a trochoidal inner peripheral surface under planetary rotary motion, since the combustion chamber thereof is flat, two spark plugs are used for one combustion chamber both to raise the performance of the engine and its economy. Ignition of both spark plugs at the normal or optimum timing with respect to the output performance of the engine is the worst possible condition with respect to the removal of the unburned detrimental components in the exhaust gas and, thus, is not preferable in terms of air pollution. If both spark plugs are retarded, although it results in a decrease in engine performance, there is a great improvement in the removal of unburned detrimental components of the exhaust gas. Further, if the leading spark plug which is disposed to the front side in the rotation direction of the piston of both spark plugs, is ignited normally while the trailing spark plug disposed to the rear in the rotating direction of the piston has its ignition terminated, the engine performance becomes less valuable, but again there is an improvement in the removal of unburned detrimental components in the exhaust gas. On the other hand, if the leading spark plug of the two spark plugs is retarded in terms of its ignition timing, while the trailing spark plug is not ignited or is ignited at a time having no reference to engine performance, the worst possible engine performance occurs, but such performance is most effective in removing the unburned detrimental components in the exhaust gas.

Further, the unburned detrimental components in the exhaust gas are much heavier in the exhaust gas during engine warmup, and they are considerably reduced after the engine warms up. At the same time, in the operation of the engine under the post-warmup period, the unburned detrimental components in the exhaust gas are somewhat higher during decelerating, idling, low speed low load operation than under normal operation, and they are extremely small in the normal operating state with the exceptions described above.

SUMMARY OF THE INVENTION

The present invention provides a rotary piston internal combustion engine in which the warming up operating times are divided into decelerating, idling, low speed and low load and high speed and high load operations, and normal engine operation and also post-warming-up operating times are divided up into decelerating, idling, low speed and low load and high speed and high load operation, and the other normal operating states, such that both spark plugs are ignited at the proper ignition time in response to the four respective operating states mentioned above for the purpose of removing the unburned detrimental components in the exhaust gas without compromising engine performance.

It is another object of the present invention to provide a rotary piston internal combustion engine in which the operating states are divided in turn into four substates, such that the temperature of the cooling water or exhaust gas of the engine is detected by a thermosensor, so that the temperature if above or below a predetermined value has an effect on the operation. Further, the invention provides for the intake vacuum to be sensed at an opening disposed at the intake passage of the vacuum conduit just above the throttle valve when the throttle valve is closed and disposed at the intake passage of the vacuum conduit below the throttle valve when the throttle valve starts to open, so that the intake vacuum thereof when above or below a predetermined value changes the time for ignition of the two spark plugs such that the two spark plugs are sparked at the most proper ignition time in terms of removal of the unburned detrimental components in the exhaust gas as well as in terms of engine performance.

The other objects, features and advantages of the present invention will become apparent from the following description taken in conjunction with the accompanying drawings, in which FIG. 1 is a schematic view of one embodiment of the rotary piston internal combustion engine of the present invention incorporating the improved ignition system.

DESCRIPTION OF THE PREFERRED EMBODIMENT

Figure 1:
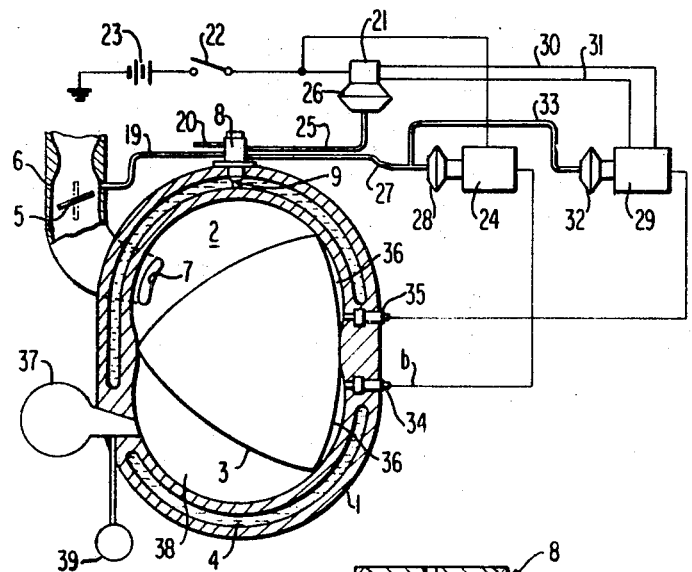

Referring to the drawings, the rotary piston internal combustion engine of the present invention involves a center wall 1 having a trochoidal inner peripheral surface, and end walls 2 disposed on both sides of the center wall. Three or more apexed pistons 3 move in a planetary motion within a casing defined by the center wall 1 and the end walls 2. Cooling water flows through the cooling water passage 4 within the center wall 1. A throttle valve 5 is disposed within an intake passage 6 of a carburetor, with the intake port 7 of the passage opening up into end wall 2. A vacuum control device 8 is mounted on the center wall 1, and a thermosensor 9 forming a portion of the vacuum control device 8 is carried thereby, so as to be disposed within the cooling water 4. The sensor 9 carries a rod 10 which is threadedly coupled at its outer end to an annular vacuum control valve 11. Thus, if the temperature of the cooling water 4 reaches a temperature above a predetermined value such as 60° C., the rod advances a predetermined distance while, if the temperature of the cooling water reduces to less than a predetermined value, it retracts a predetermined distance. The annular vacuum control valve 11, which is threaded to the rod 10, moves therewith and carries upper and lower O-rings 15 and 14, respectively, which are disposed in two annular grooves 13 and 12, respectively, which are provided on the outer peripheral surface thereof. The casing 16 of the vacuum control device 8 carries the vacuum control valve 11, which is axially movable within the casing 16 with the outer peripheral surfaces of the O-rings 14 and 15 in contact with the inner peripheral surface of the same. A spring 17 is maintained in compression within casing 16 and urges the vacuum control valve 11 downwardly. A lock nut 18 fixes the vacuum control valve 11 to the rod 10.

Figure 2:
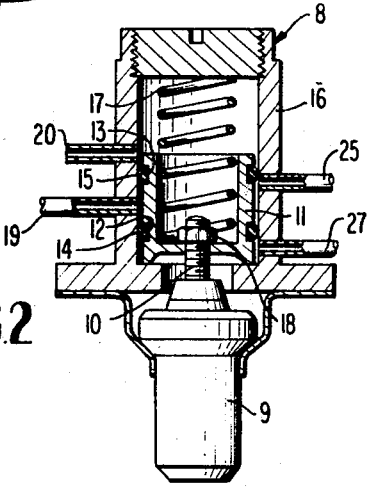
FIGS. 2 and 3 are sectional views of the vacuum control means for the ignition system of the present invention in two states of operation.
Figure 3:
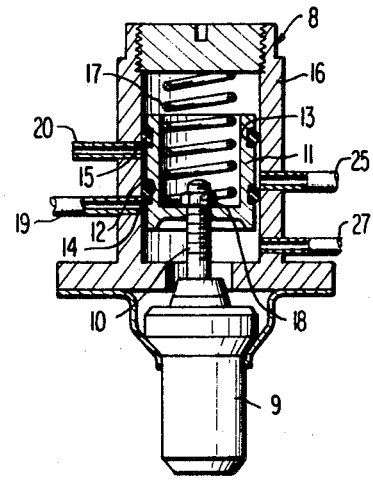

A vacuum conduit 19 has one end which opens up into the intake passage 6 such that it is disposed above the throttle valve when the throttle valve in the intake passage 6 is closed, while it is disposed below the throttle valve when the throttle valve is open slightly so as to provide the vacuum characteristics illustrated in FIG. 4. The other end of the vacuum conduit 19 communicates with a space intermediate to the upper and lower O-rings 15 and 14 when the vacuum control valve 11 is in its lowermost position as shown in FIG. 2, while when the vacuum control valve 11 is in its uppermost position as shown in FIG. 3, the vacuum conduit 19 communicates with the space below the lower O-ring 14. A conduit 20 opens up into casing 16 and is so positioned with respect to casing 16 as to be disposed above the upper O-ring 15 when the vacuum control valve 11 is disposed at its lowermost position but is connected to the space between the upper and lower O-rings when the vacuum control valve is in its raised position.

A booster switch 21 is connected to a source of electrical power 23 through a switch 22. A leading distributor 24 is connected directly to switch 22. A conduit or pipe 25 is fluid coupled to casing 16 and opens up into the space between the upper and lower O-rings 15 and 14, regardless of whether the control valve is in its uppermost or lowermost position, the conduit 25 being coupled to diaphragm 26 of the booster switch 21. A fourth conduit 27 is connected at one end to diaphragm 28 of the leading distributor 24 and is connected at the other end to casing 16 so as to be disposed below O-ring 14 regardless of the position of the valve 11. The trailing distributor 29 is of the two points type and has a contact point imparting an ignition timing regardless of engine performance and a contact point affording optimum ignition timing. When the vacuum within conduit or pipe 25 reaches a predetermined valve, it is so connected that ignition timing occurs regardless of engine performance in such a manner as to energize the contact point through a lead 30 via booster switch 21 and when the vacuum within the conduit 25 lowers below the predetermined value, it is connected to a contact point affording an optimum ignition timing through lead 31 via the same booster switch 21. A diaphragm 32 operatively coupled to the trailing distributor communicates to conduit 27 through passage 33. The leading and trailing spark plugs 34 and 35 respectively are disposed in the combustion chamber 36 of the engine on the center wall 1 and are connected to the leading and trailing distributors 24 and 29 respectively.

An exhaust gas reburning device 37 communicates with the exhaust chamber 38 of the engine so as to supply to the exhaust gas having much unburned detrimental components, secondary air via air pump in order to effect by reburning a exhaust gas having less detrimental components.

The diaphragms 28 and 32 control the ignition timing of the leading and trailing spark plugs 34 and 35 respectively to effect optimum ignition timing in response to a vacuum over a predetermined value within the conduit 27 and passage 33. When the vacuum is insufficient to act upon the diaphragm 28 and 32 or when it is prevented from acting on the diaphragms, the spark plugs 34 and 35 ignite under a delay for low speed low load within the effective range for the operation of the engine in comparison with the optimum ignition timing. The trailing spark plug 35 is arranged to ignite under delayed conditions regardless of the operation of the engine when it is connected to the lead 30. Though the spark of the trailing spark plug 35 may be cut out completely, it may continue to be energized to prevent the plug from wetting. When the lead 31 is energized, the spark plug 35 ignites at its optimum ignition timing if the diaphragm 32 is subjected to proper vacuum, but it ignites under delay conditions within the effective range for the operation of the engine when the diaphragm 32 is not subjected to sufficient vacuum.

When the temperature of the engine cooling water 4 is reduced below a predetermine value, such as 60° C., under conditions where the switch 22 is closed to operate the engine, the vacuum control valve 11 is disposed at its bottom position as shown in FIG. 2, since rod 10 is recessed. It follows that conduit 27 is in communication with neither the vacuum conduit 19 nor atmospheric conduit 20 and conduit 25 is in communication with vacuum conduit 19. When vacuum within the vacuum conduit 19, as determined by throttle valve 5, lies below a predetermined value such as, for example, a minus 120 mm. Hg, or when the vacuum lies within the A range of FIG. 4, is produced in decelerating, idling or low speed low load operation or when the throttle valve 5 becomes a substantially full open, the diaphragm 26 of the booster switch 21 effects a connection between lead 31 and source 23. Since diaphragms 28 and 32 are not operated by a vacuum since conduit 27 is cut off from vacuum conduit 19, the leading and trailing spark plugs 34 and 35 ignite under delayed conditions within the effective range of the engine under operation of respective distributors 24 and 29, in comparison with optimum ignition timing.

When the vacuum within the vacuum conduit 19 produced by throttle valve 5 reaches above a predetermined value such as minus 120 mm. Hg, or when the vacuum lies within the B range in FIG. 4, is produced, except in the various operations, the diaphragm 26 of the booster switch 21 now shuts off the connection between lead 31 and the source of power 23 and connects the lead 30 to the source of power. Whereupon, one side of the trailing plug 35 may ignite, but it ignites at an ignition timing regardless of the power performance of the engine. Since the vacuum does not operate on either diaphragm 28 or diaphragm 32, the other leading spark plug 34 ignites under delay conditions within the effective range for the operation of the engine in comparison with the optimum ignition timing which is achieved by leading distributor 24.

Then, when the temperature of the cooling water 4 of the engine reaches a predetermined value, such as 60° C., the rod 10 advances from the state shown in FIG. 2 to the state shown in FIG. 3 to move the vacuum control valve 11 to its uppermost position. Atmospheric conduit 20 now communicates with conduit 25, and the vacuum conduit 19 is now in communication with conduit 27, respectively. For this reason, the pressure within the pipe 25 is equal to the atmospheric pressure and the diaphragm 26 of booster switch 21 now switches connections such that lead 31 is connected to the source of power 23. When the vacuum within the vacuum conduit 19 produced by the throttle valve 5 reduces below a predetermined value in the A range, as shown in FIG. 4, the vacuum is insufficient to act upon the diaphragm 28 and 32 although coupled thereto. Accordingly, the leading and trailing spark plugs 34 and 35 ignite under delay conditions in comparison with the optimum ignition timing normally produced by distributors 24 and 29 respectively. When the vacuum within the vacuum conduit 19 produced by the throttle valve 5 reaches a predetermined value in excess of the B range, FIG. 4, the vacuum pressure is transmitted to the diaphragms 28 and 32 through conduit 27 and passage 33 so that both diaphragms 28 and 32 are operated in response to this vacuum pressure. For this reason, both the leading and trailing spark plugs 34 and 35 now ignite at the optimum ignition timing by distributors 24 and 29 respectively.

Figure 4:
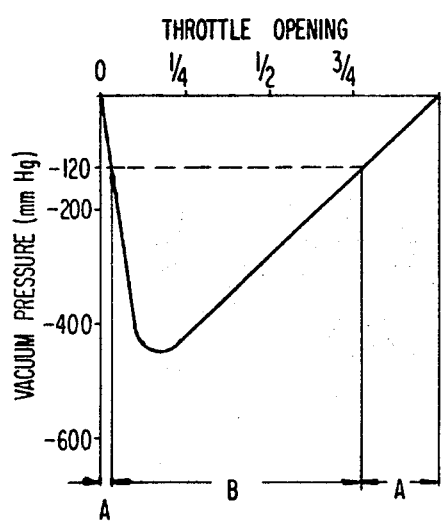
fig. 4 is a graphical representation of the relationship between vacuum pressure and throttle opening of the intake vacuum passage with respect to the engine of FIG. 1.

When the throttle valve 5 becomes substantially full open to operate the engine, the vacuum acting on diaphragms 28 and 32 reduces below a predetermined value as illustrated in FIG. 4, regardless of the temperature of the engine cooling water 4, so that the leading and trailing spark plugs 34 and 35 ignite under delay conditions in comparison with optimum ignition timing. The reason for this is that the combustion time within the engine combustion chamber 36 in this operating state is extremely short with the result that is preferable to delay the ignition timing rather than advance the sparking thereof.

According to the present invention as described above, when the vacuum change occurring by opening of the throttle valve 5 is below a predetermined value, as the temperature of the cooling water is below a predetermined value, the leading and trailing spark plugs 34 and 35 ignite under delay conditions within the effective range for the engine operation while when the vacuum reaches a predetermined value, the leading spark plug 34 ignites under delay conditions within the effective range for engine operation while the trailing spark plug 35 ignites at the ignition timing, regardless of the power performance of the engine, or is cut off from sparking and, further, when the temperature reaches a predetermined value insofar as the cooling water is concerned, both the leading and trailing spark plugs 34 and 35 ignite under delay conditions within the effective range for engine operation and in response to an increase to proper vacuum pressure, at optimum timing, respectively.

Accordingly, during the warming up operation though much of the unburned detrimental components of the exhaust gas is discharged when the engine is decelerating or idling, the absolute amount thereof is relatively small and, if the leading spark plug is retarded in its sparking, while the trailing spark plug is ignited at the ignition timing regardless of engine performance, or is actually cut off from sparking, this arrangement is most suitable for the removal of the unburned detrimental components of the exhaust gas, but it tends to cause irregular ignition, tends to cause irregular rotation of the piston and thus the engine loses it s utility with the result that both spark plugs are retarded in sparking or ignition and in normal operation the irregular rotation is avoided and the absolute quantity of the unburned detrimental components in the exhaust gas becomes larger, with the result that, as described previously, the leading spark plug is retarded while the trailing spark plug is ignited under ignition timing regardless of engine performance or is simply cut off from ignition. For this reason, since the combustion of the combustible mixture is delayed the combustion step of the engine, the exhaust gas reaches a high temperature so that it is introduced to the reburning device 37 together with secondary air so as to reburn prior to discharge to the atmosphere and thus the exhaust gas has extremely small unburned detrimental components as a result of reburning.

Further, after the engine is warmed up, the function of the reburning device 37 in burning unburned detrimental components improves sufficiently together as well as combustion within the combustion chamber, so that the unburned detrimental components in the exhaust gas become less during decelerating, idling, low speed and low load operation, after warmup, so that if both the spark plugs are now retarded in terms of ignition timing, this is quite efficient in removal of detrimental components. While, also, during normal operation, the unburned detrimental components are extremely small, so that both spark plugs may be ignited under optimum ignition timing conditions. Thus, both spark plugs are then operated at optimum ignition timing so that the engine is operating both at a high performance and high economic state.

It should be understood from the foregoing description that the present invention maintains the engine performance while removing the detrimental components in the exhaust gas as completely as possible by controlling the ignition timing of both spark plugs in response to the four operating states, that is, for each operating state comprising: warmup, post-warmup and, further, decelerating, idling, low speed and low load, high speed and high load operations, and normal operations.

In the above embodiment, the vacuum control device 8 has a thermosensor 9 which senses the temperature of the engine cooling water 4 which is disposed on the center wall 1, but in order to sense the temperature of the exhaust gas, it may also be disposed in the engine exhaust gas system rather than in the engine cooling water, with the same effect as seen above.

What is claimed is:

1. In a rotary piston internal combustion engine including a vacuum intake and trailing and leading spark plugs disposed in one combustion chamber of the engine, the improvement comprising:

multipoint trailing and leading distributors connected to said trailing and leading spark plugs, respectively, first vacuum pressure responsive switch means for controlling each distributor to advance timing of its respective spark plug, and second vacuum pressure responsive switch means operatively coupled to said trailing distributor for modifying the ignition timing of said trailing spark plug, and control means sensitive to engine temperature for selectively coupling said second vacuum responsive switch means to said vacuum intake at low engine temperature at a temperature below a predetermined value, and coupling said first vacuum pressure responsive switch means to said vacuum intake at engine temperature above said predetermined value, whereby when the engine temperature is below a predetermined value and the intake vacuum is low, both spark plugs are delayed within the effective range for engine operation, but when the intake vacuum reaches a predetermined value, said trailing spark plug at low engine temperature has its ignition timing advanced while said leading spark plug has its ignition timing delayed within the effective range for engine operation, and further when the temperature of the engine exceeds a predetermined value, both spark plugs have their ignition timing delayed within the effective range for engine operation as the intake vacuum is below a predetermined value, but when the intake vacuum exceeds a predetermined value, ignition of both plugs is advanced.

2. The rotary piston internal combustion engine as claimed in claim 1, wherein said first and second vacuum pressure responsive switch means comprises diaphragm operated switches and said engine temperature responsive control means comprises a thermosensor mounted within the combustion engine housing and in contact with the said engine coolant, and said control means further includes an axially shiftable valve for selectively controlling the application of vacuum pressure from the vacuum intake to said first and second pressure responsive switch means.

3. The rotary piston internal combustion engine as claimed in claim 1, wherein said trailing distributor includes a normal contact point for normal ignition and a second contact point for controlling ignition timing at other than optimum timing and wherein said second vacuum pressure responsive switch means constitutes a diaphragm switch operated by intake vacuum such that when the intake vacuum is below a predetermined value, said normal contact point is in the ignition system, but when the intake vacuum exceeds a predetermined value, said diaphragm switch effects ignition through said second contact point and terminates ignition through said normal contact point.

4. The rotary piston internal combustion engine as claimed in claim 1, wherein said temperature responsive control means has coupled thereto, a first pipe receiving the engine intake vacuum, a second pipe for directing the intake vacuum to the second vacuum responsive switch means, and a third pipe for directing intake vacuum pressure to both of said vacuum pressure responsive switch means associated with said trailing and leading distributors and said control means includes a valve member at a first position at an engine temperature below a predetermined value such that the first pipe is connected to the second pipe but is simultaneously cut off from said third pipe, while at an engine temperature above said predetermined value, said valve member is at a second position where said first pipe is connected to said third pipe while said first pipe is simultaneously disconnected from said second pipe.

5. The rotary piston internal combustion engine as claimed in claim 4, wherein said temperature responsive control means comprises a thermosensor including a rod which extends therefrom when the temperature exceeds a predetermined value, a cylinder fixed to said thermosensor and defining a closed chamber and a movable valve member fixedly coupled to the end of said rod and axially shiftable with said cylinder, the ends of said pipes being connected to said cylinder, and opening up into the interior of the same, whereby, with said rod and said valve member in retracted position, said first pipe is connected to said second pipe but disconnected from said third pipe, and with said rod and said valve member in extended position, said first pipe is connected to said third pipe but is disconnected from said second pipe.

* * * * *